(12) United States Patent
Mülle et al.

(10) Patent No.: US 8,056,315 B2
(45) Date of Patent: Nov. 15, 2011

(54) CHAIN CONNECTING LINK

(75) Inventors: Wilhelm Mülle, Fröndenberg (DE);
Eugeniusz Brodziak, Iserlohn (DE)

(73) Assignee: Thiele GmbH & Co. KG, Iserlohn (DE)

( * ) Notice: Subject to any disclaimer, the term of this patent is extended or adjusted under 35 U.S.C. 154(b) by 317 days.

(21) Appl. No.: 12/440,352

(22) PCT Filed: Aug. 16, 2007

(86) PCT No.: PCT/DE2007/001448
§ 371 (c)(1),
(2), (4) Date: Mar. 6, 2009

(87) PCT Pub. No.: WO2008/046371
PCT Pub. Date: Apr. 24, 2008

(65) Prior Publication Data
US 2010/0037585 A1 Feb. 18, 2010

(30) Foreign Application Priority Data
Oct. 16, 2006 (DE) ............ 20 2006 016 032 U

(51) Int. Cl.
*F16G 15/04* (2006.01)
(52) U.S. Cl. ................. 59/85; 59/78; 59/84
(58) Field of Classification Search ........... 59/78, 84, 59/85, 86, 87, 88
See application file for complete search history.

(56) References Cited

U.S. PATENT DOCUMENTS

| | | | | |
|---|---|---|---|---|
| 4,505,103 A * | 3/1985 | Dalferth et al. | ...... | 59/85 |
| 6,216,434 B1 * | 4/2001 | Dalferth et al. | ...... | 59/85 |
| 6,216,435 B1 * | 4/2001 | Bogdan et al. | ...... | 59/85 |
| 6,223,517 B1 * | 5/2001 | Bogdan et al. | ...... | 59/85 |
| 6,679,648 B2 * | 1/2004 | Benecke | ...... | 59/85 |

FOREIGN PATENT DOCUMENTS

| | | |
|---|---|---|
| DE | 201 224 C | 10/1908 |
| DE | 20 55 826 A1 | 5/1972 |
| DE | 39 16 284 A1 | 11/1990 |
| DE | 90 10 317 U1 | 11/1991 |
| DE | 196 52 262 A1 | 6/1998 |
| DE | 20120 032 U1 | 6/2002 |

* cited by examiner

*Primary Examiner* — David Jones
(74) *Attorney, Agent, or Firm* — Henry M. Feiereisen; Ursula B. Day

(57) ABSTRACT

The invention relates to a chain connecting link, which has two link brackets (4, 5) coupled via their limbs (6, 9), and a bar (14a-14c) that is inserted transversely between the limbs (6, 9) of the link brackets (4, 5). One limb (6) of each link bracket (4, 5) comprises a neck section (7) and a pin (8) thicker than the neck section, and a neck recess (10) and a pin recess (11) are provided in a matching fashion at the other limb (9) of the link bracket (4, 5). According to the invention, conically configured flank surfaces (12) with respect to the vertical central longitudinal plane (MLE) are provided at each pin (8) and at each pin recess (11).

16 Claims, 5 Drawing Sheets

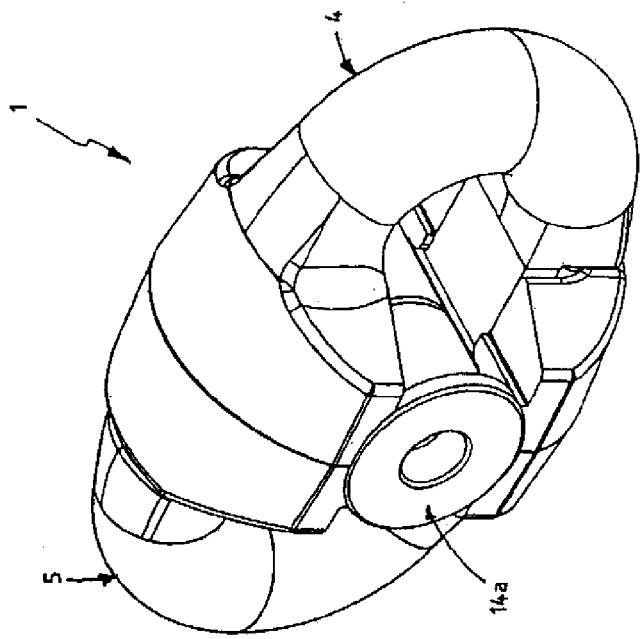
Fig. 1A
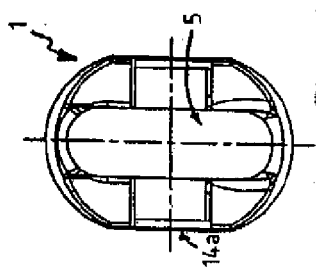
Fig. 1B
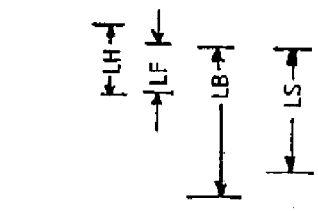
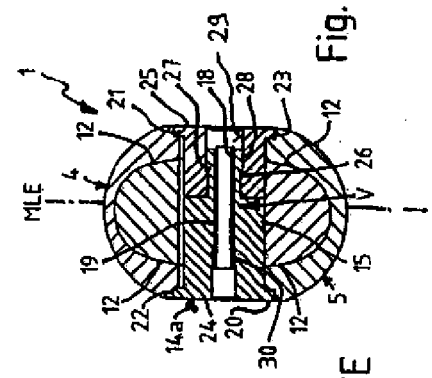
Fig. 1F
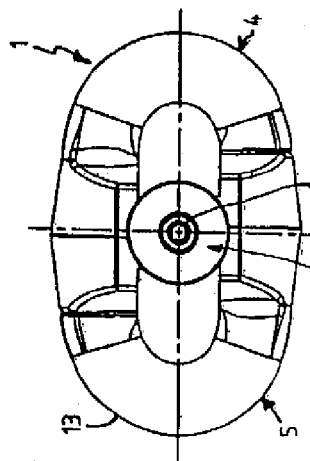
Fig. 1C
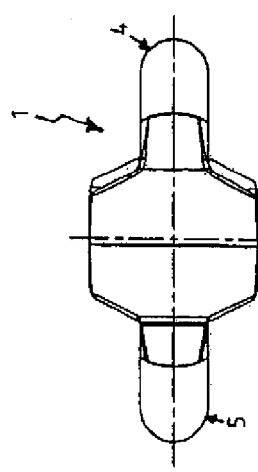
Fig. 1D
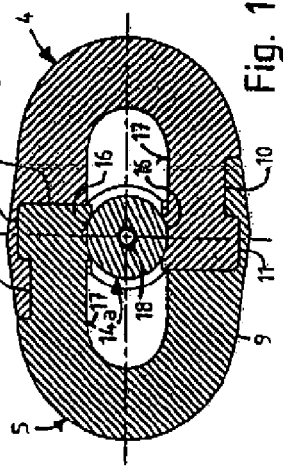
Fig. 1E

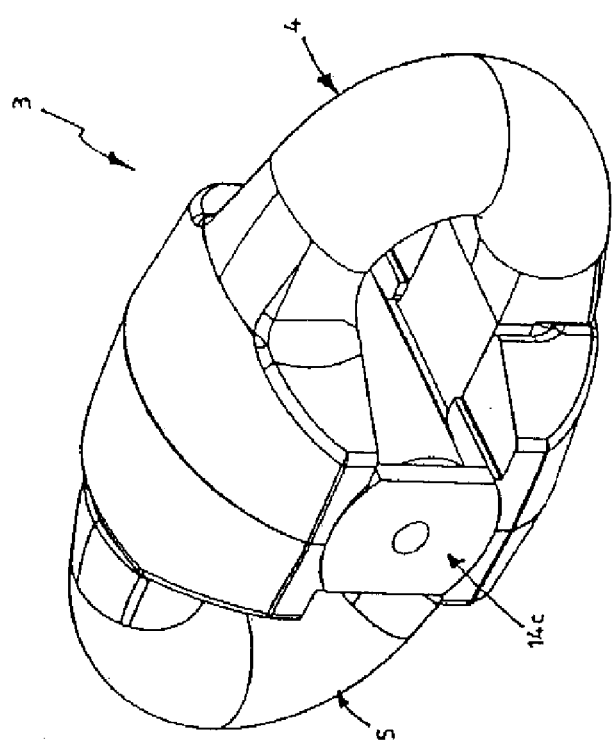
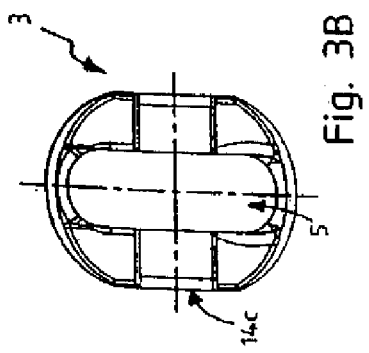
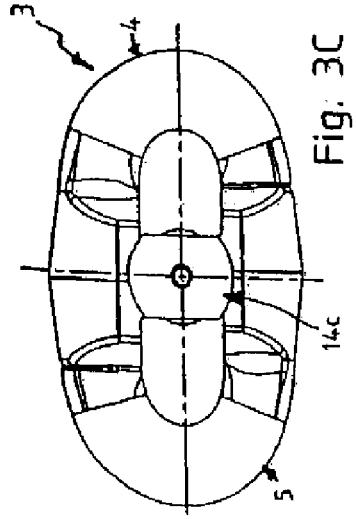
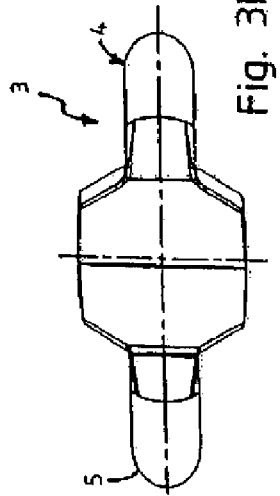
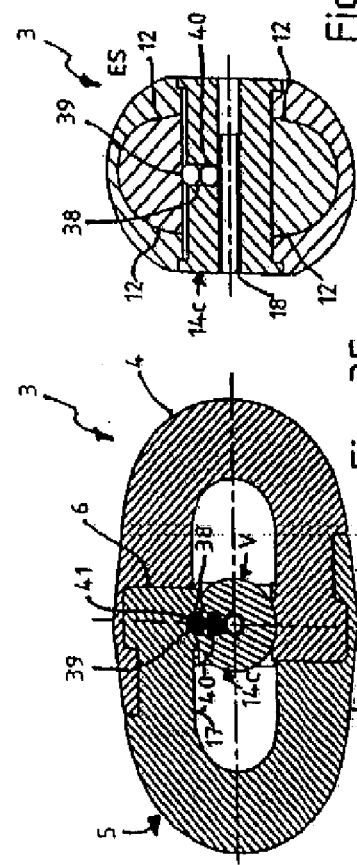
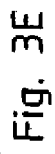

CHAIN CONNECTING LINK

BACKGROUND OF THE INVENTION

The invention relates to a chain connecting link.

Chain connection links find particular application in high-performance round steel chains that are utilized in underground mining. It is known that, after usage, disassembly of chain connecting links in the Kenter configuration can be problematic since the long spring pin rusts into the bore which penetrates the opposite limbs of the two link halves and the bar, and which extends in an inclined manner in the chain connecting link plane. In addition, due to the loading stress of the two link halves of the chain connecting link, the spring pin and the bar, which is arranged between the link halves, are subjected to shearing. This additionally hampers driving the spring pin out of the long bore. Furthermore, a long spike is necessary to drive the spring pin out, during which process the long spring pike is exposed to high bending load that the spike can resist to a limited degree only.

The Kenter shackle known from DE-PS 201 224 has been further developed in various embodiments. In the further development according to DE 90 10 317 U, a chain connecting link, in particular for high-performance round steel chains, was proposed, in which a retaining ball is used as the locking element. The retaining ball can be fixed in its locking position by a spring pin that is driven in crosswise with respect to the chain link plane. A relatively short spring pin can be used which can be easily driven out of the bar to the other side with a short spike that is, accordingly, bending-resistant, even if the spring pin rusts into the bore of the bar. As a result, both assembly and disassembly are simplified. However, it is a disadvantage that the production expenditure is increased and that the retaining ball is an additional component which, therefore, increases the variety of components. The chain connecting link disclosed in DE 196 52 262 C2 has this disadvantage too. There, instead of the retaining ball, separate locking elements are used which are connected with each other via a pivoting bolt that penetrates the bar component. By pivoting by 90°, the locking elements encompass guiding areas at the limbs of the link brackets so that the bar component is secured against falling out of the chain connecting link. A locking pin, which is driven in parallel to the pivot axis, ensures the positional fixation of the ring element.

SUMMARY OF THE INVENTION

It is an object of the invention to provide a chain connecting link which can be easily assembled and easily disassembled even after operation over a longer period of time, and which is highly rigid.

This object is attained in accordance with the invention by a chain connecting link including two link brackets which are coupled via their limbs and a bar which is transversely inserted between the limbs of the link brackets, wherein one limb of each link bracket has a neck section and a pin which is thicker than the neck section and wherein a corresponding neck recess and a corresponding pin recess are provided at the other limb of the link bracket, wherein inclined flank surfaces are provided at each pin and at each pin recess with respect to the vertical central longitudinal plane of the pins which plane is defined by the symmetry plane of the chain connecting link.

The chain connecting link has two link brackets which are coupled via their limbs and a bar that is transversely inserted between the limbs of the link brackets. One limb of each link bracket has a neck section and a pin that is thicker than the neck section At the other limb of the link bracket, a corresponding neck recess and a corresponding pin recess are provided.

It is the core of the invention that inclined flank surfaces are provided at each pin and at each pin recess with respect to the vertical central longitudinal plane of the pins, which plane is defined by the symmetry plane of the chain connecting link.

Due to the conical configuration of the flank surfaces, the force transmission is optimized in the areas of the neck section and the pin. As a consequence, the load capacity of the chain connecting link is advantageously increased.

Advantageous embodiments of further developments of the inventive idea are the subject matter of the dependent claims.

Parallel flank surfaces with respect to the vertical central longitudinal plane of the pins are provided at each neck section and at each neck recess. The parallel flank surfaces contribute to the perfect plugging of the link brackets into each other. It is particularly advantageous if the central transverse plane of the chain connecting link intersects the pins. In this way, the pins and the pin recesses are arranged in an approximately centered manner with respect to the center of the lock. As a result, a more favorable loading stress is achieved which leads to higher breaking forces.

The bar is positionally fixed by a locking mechanism which is secured by a locking pin. The locking pin can be inserted in a bore in or at the bar. The length of the locking pin is shorter than the length of the bore. Due to the shorter locking pin, assembly and especially disassembly is significantly easier, even after corrosion took place. Significantly less force is required to knock out the locking pin.

In a further development, the bar is embodied by a bolt and a sleeve. The sleeve is form-fittingly plugged onto a spring pin. Thus, the bolt and the sleeve can be inserted between the limbs from two sides and arrested there. It is irrelevant from which side the bolt or the sleeve is inserted.

The spring pin is graded on the outer side and the sleeve has on the inner side a collar step. Thus, the sleeve latches form-fittingly when it is slid on the spring pin. Alternatively, the spring pin has on the outer side a collar, and the sleeve has on the inner side a collar groove. Such a configuration has the advantage that the sleeve, besides the form-fitting fixation, can be slid on the spring pin with less force.

The spring pin has multiple longitudinal slots. Due to the number and arrangement of the longitudinal slots, the spring force of the spring pin can be advantageously influenced, The length of the spring pin is shorter than the length of the sleeve. In this way, pushing the spring pin out of the sleeve due to objects striking the face side of the sleeve, which could possibly result in an unlocking of the chain connecting link, is avoided.

The locking pin is knocked into an axial bore of the bolt. This bore extends through the spring pin so that the spring pins are advantageously held in position by the locking pin. The axial bore of the bolt has a step which facilitates the knocking in of the bolt.

The length of the locking pin is shorter than the length of the bolt. This advantageously ensures that the locking pin neither extends beyond the face side of the bolt nor beyond the free ends of the spring pins. In this way, unintended pushing of the locking pin out of the bar is hampered.

In accordance with another embodiment, the bar has a cylindrical middle section whose diameter is suited to guiding grooves in the inner sides of the limbs and which has an axial pull-out prevention which circumferentially protrudes in some areas radially outwards beyond the diameter of the cylindrical middle section and form-fittingly engages the limbs, when the bar is rotated about its longitudinal axis. Due to the locking pin blocking the rotational movement of the bar with respect to the limbs, the bar can be fixed in the engagement position. Preferably, the axial pull-out prevention is formed in one piece with the bar. Preferably, the bar is a rotatable part. At least one radially protruding collar serves as the axial pull-out prevention.

The axial pull-out prevention is configured such that, by rotating the bar about its longitudinal axis, the axial pull-out prevention form-fittingly engages the limbs. Only due to the form-fitting engagement of the limbs is the bar secured against axial displacements, i.e., against transverse displacements with respect to the central longitudinal plane of the chain link. Due to the engagement of the cylindrical middle section with the mirror-inverted guiding grooves in combination with the axial pull-out prevention, the spatial position of the bar within the link bracket is defined. The bar can only be removed again from in-between the link brackets by further rotation of the bar into its starting position, i.e., without the axial pull-out prevention being in form-fitting engagement with the limbs. The rotational movement is blocked by a locking pin which fixates the axial pull-out prevention and, thus, the bar in the engagement position.

Such a chain connection link has the advantage that no additional form-fitting members are necessary for defining the spatial location of the bar. Both assembly and disassembly are easily possible even after operation over a longer period of time, since especially the locking pin which blocks the rotational movement of the bar can be very short, depending on the path of the bore.

It is particularly advantageous if a first partial perimeter section of the locking pin abuts on the bar and a second partial perimeter section of the locking pin abuts, in a depression, on the inner side of the limbs, wherein the longitudinal axis of the locking pin extends parallel to the longitudinal axis of the guiding grooves.

Alternatively, at least two locking members which contact each other are arranged in a cross hole of the bar. The at least two locking members can be moved by the locking pin to an engagement position, wherein, in the engagement position, one locking member rests in the depression on the inner side of a limb. It is advantageous that the locking pin is arranged in an axial bore, as a result of which assembly and disassembly of the chain connecting link is facilitated.

BRIEF DESCRIPTION OF THE DRAWINGS

The invention is explained in more detail below in conjunction the exemplary embodiments illustrated in the drawings. It is shown in:

FIGS. 1A to 1F a chain connecting link in accordance with a first embodiment;

FIGS. 3A to 3F a chain connecting link in accordance with a third embodiment;

Figure 2A:
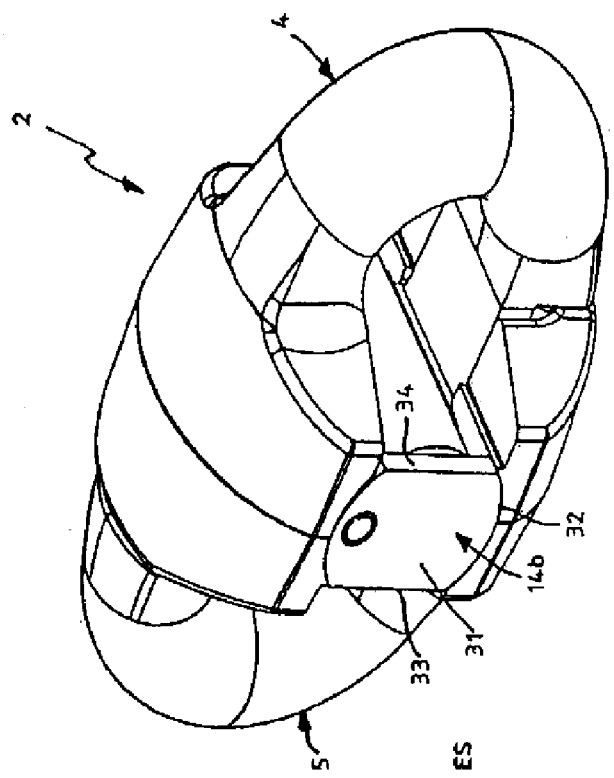
FIGS. 2A to 2F a chain connecting link in accordance with a second embodiment.
Figure 2B:
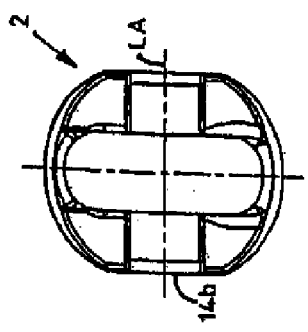
Figure 2F:
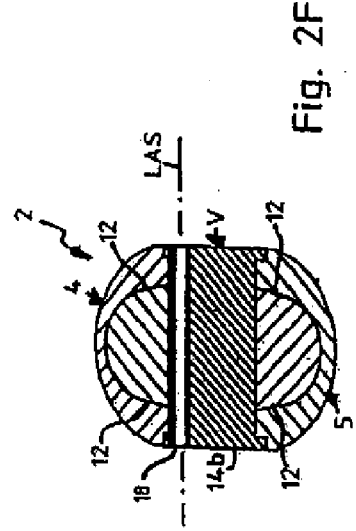
Figure 2C:
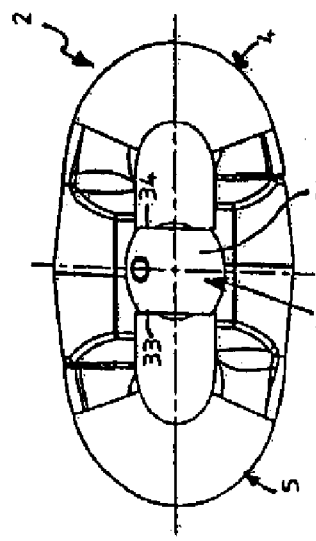
Figure 2D:
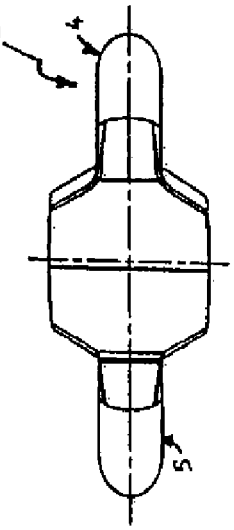
Figure 2E:
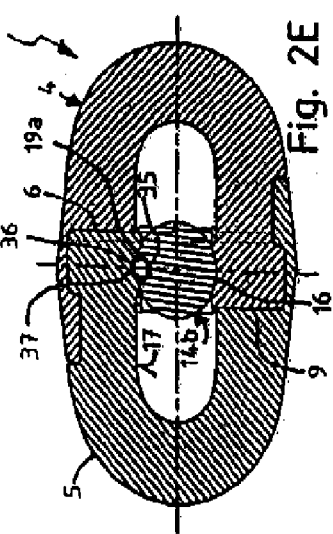

DETAILED DESCRIPTION OF PREFERRED EMBODIMENTS.

In the Figures, the chain connecting links in accordance with the invention have the reference numerals 1-3.

Figure 4:
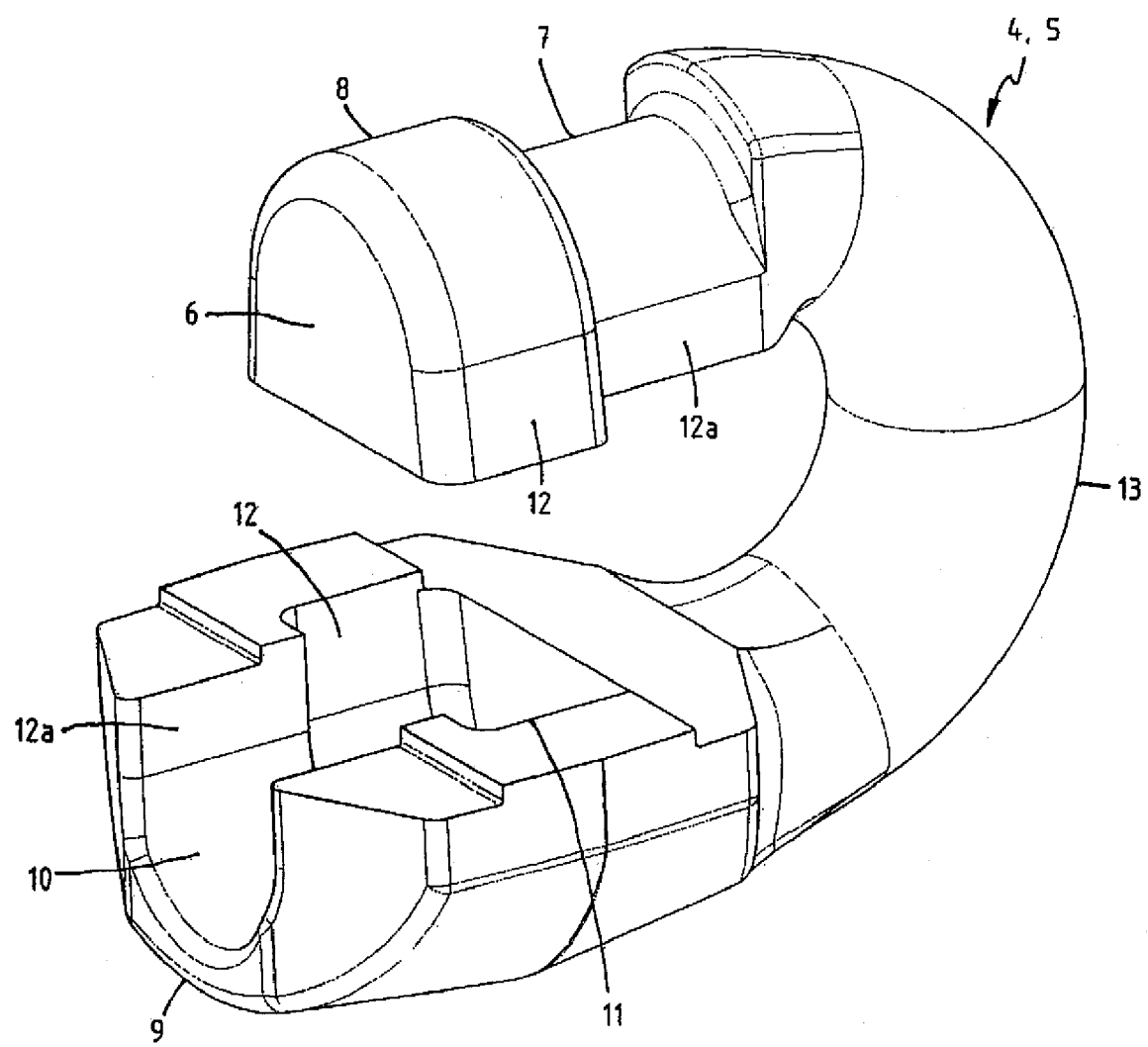
FIG. 4 a perspective view of a link bracket.

Each chain connecting link 1-3 of the FIGS. 1A to 3F has two equal link brackets 4, 5 which are coupled via their limbs. The link brackets 4, 5 are identical in all Figures. In addition, a limb 6 of each link bracket 4, 5 has a neck section 7 and a pin 8 which is thicker than the neck section 7. A corresponding neck recess 10 and a corresponding pin recess 11 are provided at the other limb 9 of the link bracket 4, 5. In accordance with the invention, conically configured flank surfaces 12 with respect to the vertical central longitudinal plane MLE of the pins 8 are provided at each pin 8 and at each pin recess 11 (see also FIGS. 4 and 5). Furthermore, the length L of the limb 6 is dimensioned such that the central transversal plane MQE of the chain connecting link 1-3 intersects the pins 8.

The link brackets 4, 5 are made of a suitable steel material by a forging process and have in bracket section 13 an oval to circular cross-section. In known manner, the link brackets 4, 5 can be alternately threaded into end links of two chain strands which are not shown in detail.

To couple the link brackets 4, 5, the link brackets 4, 5 are plugged into each other and then locked by a bar 14a-14c that is transversely inserted between the limbs 6, 9 of the link brackets 4, 5. The bar 14a-14c has a cylindrical middle section 15 whose diameter DM is adapted to the guiding grooves 16 in the inner sides 17 of the limbs 6, 9. The bar 14a-14c is secured by a locking pin 18, which can be inserted in a bore 19, 19a in or at the bar 14a-14c. The length LS of the locking pin 18 is respectively shorter than the length LB of the bore 19, 19a. The ends of the bar 14a-14c have axial pull-out prevention 20, 21 which protrude, beyond the diameter DM of the middle section 15, towards the outside and which form-fittingly abut, in recesses 22, 23, on a respective limb 6, 9 of the link brackets 4, 5. Three embodiments of the bar 14a-14c are shown in FIGS. 1A-1F to 3A-3F whose differences are described below.

In the embodiment of FIGS. 1A-1F, the bar is formed by a bolt 24 and a sleeve 25, wherein the sleeve 25 is form-fittingly plugged on an axial spring pin 26 of the bolt 24. The spring pin 26 has a longitudinal slot and, on the perimeter side, a step 27 which engages a collar step 28 provided in a bore 29 of the sleeve 25. The length LF of the spring pin 26 is shorter than the length LH of the sleeve 25, and the locking pin 18 is knocked into the axial bore 19 of the bolt 24. The axial bore 19 of the bolt 24 has a shoulder 30, as a result of which the knocking in and knocking out of the locking pin 18 is facilitated.

The bar 14b, 14c in the embodiments of FIGS. 2A-2F and 3A-3F is integrally formed. At one end 31, the axial pull-out prevention 32 is flattened at two parallel sides 33, 34. In this way, by rotation of 90° about the longitudinal axis LA, the bar 14b, 14c can be moved from a starting position, which is not shown in detail, to an engagement position ES. The bar 14b, 14c can be fixed in the engagement position ES by the locking pin 18, which blocks the rotational movement of the bar 14b, 14c with respect to the limbs 6, 9.

In the embodiment of FIGS. 2A-2F, a first partial perimeter section 35 of the locking pin 18 abuts on the bar 14b and a second partial perimeter section 36 abuts, in a depression 37, on the inner side 17 of the limbs 6, 9. The longitudinal axis LAS of the locking pin 18 extends parallel to the longitudinal axis of the guiding grooves 16.

In the embodiment of FIGS. 3A-3F, the bar 14c has a middle cross hole 38. At least two locking members 39, 40 which contact each other are arranged in the cross hole 38. As can be seen in FIGS. 3E and 3F, the locking members 39, 40 are balls made of steel. The locking members 39, 40 can be moved by the locking pin 18 to an engagement position ES. In the engagement position ES, a locking member 39 rests in the depression 41 on the inner side 17 of a limb 6.

Figure 5:
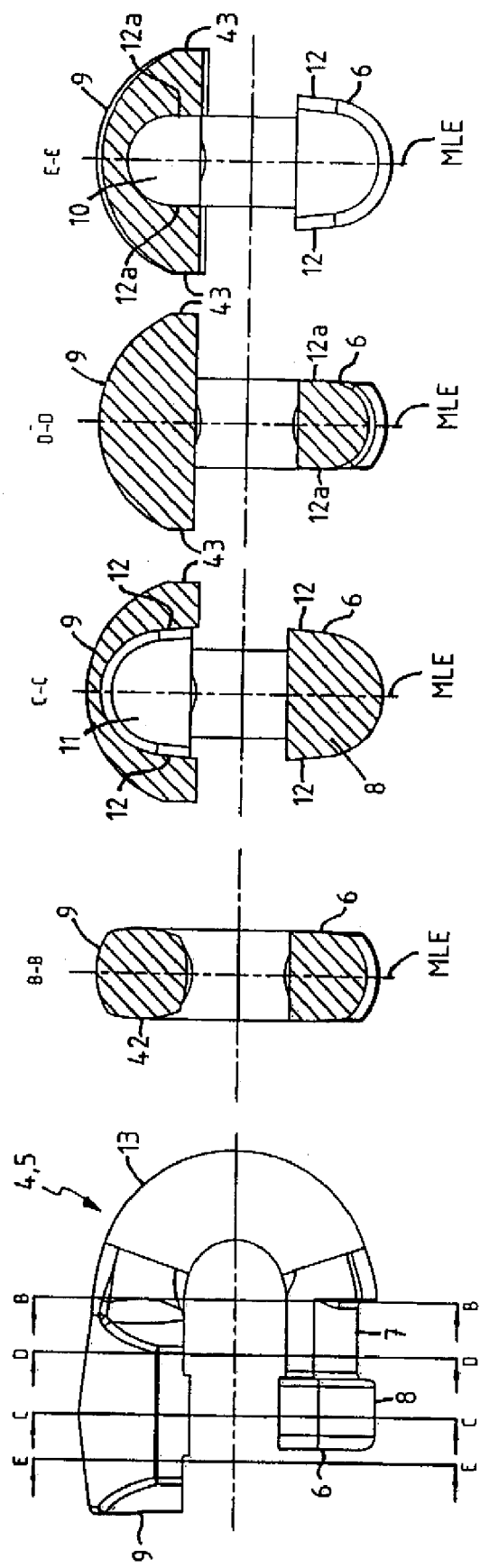
FIG. 5 multiple cross section views of the link bracket.

FIG. 5 shows a side view of the link bracket 4, 6. To the right thereof, four cross-section illustrations are shown that extend along the lines B-B, C-C, D-D and E-E in the side view. It can be seen in the section view B-B that the limb 4 has a substantially square cross-section with side surfaces 42 that are curved towards the outside. In the section view C-C, the pin 8 and the pin recess 11 can be seen. The flank surfaces 12 of the pin 8 and the pin recess 11 are conically configured with respect to the vertical central longitudinal plane MLE of the pins 8. The limb 9 is greatly widened in the area of the pin recess 11 and has parallel side surfaces 43. In section view D-D, is it noticeable that, in the area of the neck 7, the flank surfaces 12a are parallel with respect to the vertical central longitudinal plane MLE of the pin 8. The same applies to the flank surfaces 12a of the neck recess 10 shown in section view E-E, which are also parallel.

What is claimed is:

1. A chain connecting link, comprising:
two link brackets having limbs to couple the link brackets with each other, wherein one of the limbs of each link bracket has a neck section and a pin of a thickness which is greater than a thickness of the neck section, and another one of the limbs has a neck recess and a pin recess of a contour to complement the neck section and the pin section, respectively, so that the pin of one of the link brackets is engageable in the pin recess of the other one of the link brackets and the neck section of the one of the link brackets is engageable in the neck recess of the other one of the link brackets, wherein the pin of one of the limbs and the pin recess of the other one of the limbs of each link bracket define a vertical central longitudinal plane and have first flank surfaces which are inclined with respect to the vertical central longitudinal plane; and
a bar transversely arranged between the link brackets to lock the coupled link brackets.

2. The chain connecting link of claim 1, wherein the neck section and the neck recess have second flank surfaces in parallel relationship to the vertical central longitudinal plane.

3. The chain connecting link of claim 1, wherein the chain connecting link defines a central transversal plane which intersects the pin of one of the link brackets and the pin of the other one of the link brackets.

4. The chain connecting link of claim 1, further comprising a locking mechanism to secure the bar in place, and a locking pin to secure the locking mechanism, wherein the locking pin is insertable in a bore formed in or at the bar and has a length which is shorter than a length of the bore.

5. The chain connecting link of claim 4, wherein the bar comprises a bolt and a sleeve which is form-fittingly plugged onto a spring pin of the bolt.

6. The chain connecting link of claim 5, wherein the spring pin has a graded outer side, with the sleeve having an inner side formed with a collar step.

7. The chain connecting link of claim 5, wherein the spring pin has a collar on an outer side, with the sleeve having an inner side formed with a collar groove.

8. The chain connecting link of claim 5, wherein the spring pin has a plurality of longitudinal slots.

9. The chain connecting link of claim 5, wherein the spring pin has a length which is less than a length of the sleeve.

10. The chain connecting link of claim 5, wherein the bolt has an axial bore, with the locking pin being received in the axial bore of the bolt.

11. The chain connecting link of claim 10, wherein the axial bore of the bolt has a shoulder.

12. The chain connecting link of claim 4, wherein the bar includes a cylindrical middle section defined by a diameter which conforms to guiding grooves on an inside of the limbs, and an axial pull-out prevention which circumferentially protrudes radially outwards beyond the diameter of the cylindrical middle section and form-fittingly engages the limbs in an engagement position, when the bar is rotated about its longitudinal axis, with the bar being secured in the engagement position by the locking pin which blocks a rotation of the bar in relation to the limbs.

13. The chain connecting link of claim 12, wherein the locking pin has a first partial perimeter section which bears upon the bar, and a second partial perimeter section which rests in a depression on an inner side of the limbs, said locking pin being defined by a longitudinal axis which extends parallel to a longitudinal axis of the guiding grooves.

14. The chain connecting link of claim 12, further comprising at least two locking members in contact with one another and arranged in a cross hole of the bar, wherein the locking pin is operable to move the at least two locking members into an engagement position in which one of the at least two locking members rests in a depression on an inner side of one of the limbs.

15. The chain connecting link of claim 12, wherein the axial pull-out prevention and the bar form a single-piece construction.

16. The chain connecting link of claim 12, wherein the axial pull-out prevention includes at least one radially protruding collar.

* * * * *